United States Patent
Eberle et al.

(10) Patent No.: US 7,055,778 B2
(45) Date of Patent: Jun. 6, 2006

(54) APPARATUS AND METHOD FOR LIGHTER-THAN-AIR AIRCRAFT

(76) Inventors: Martin Eberle, a+i engineering, Königreicher Str. 6F, D-21635, Jork (DE); Tim Rabel, a+i engineering, Am Soellinger 10, D-75015, Bretten (DE)

( * ) Notice: Subject to any disclaimer, the term of this patent is extended or adjusted under 35 U.S.C. 154(b) by 195 days.

(21) Appl. No.: 10/752,425

(22) Filed: Jan. 6, 2004

(65) Prior Publication Data

US 2005/0156082 A1    Jul. 21, 2005

(51) Int. Cl.
B64B 1/02    (2006.01)

(52) U.S. Cl. .......................... 244/96; 244/24
(58) Field of Classification Search ................ 224/24, 224/29, 30, 26, 33, 115, 116, 96–98; 244/24, 244/29, 30, 26, 33, 115, 116, 96–98, 31
See application file for complete search history.

(56) References Cited

U.S. PATENT DOCUMENTS

| | | | | | |
|---|---|---|---|---|---|
| 1,035,560 | A | * | 8/1912 | Erdmann | 244/98 |
| 1,549,061 | A | * | 8/1925 | Chenu | 244/98 |
| 1,734,812 | A |   | 11/1929 | Krell | |
| 2,024,587 | A | * | 12/1935 | Lehmann | 244/63 |
| 2,704,193 | A | * | 3/1955 | Alard | 244/116 |
| 3,128,969 | A | * | 4/1964 | Yost | 244/98 |
| 3,170,658 | A | * | 2/1965 | Yost | 244/98 |
| 3,346,216 | A | * | 10/1967 | Desmarteau | 244/30 |
| 3,746,282 | A | * | 7/1973 | Vorachek | 244/31 |
| 3,971,533 | A | * | 7/1976 | Slater | 244/30 |
| 4,215,834 | A |   | 8/1980 | Dunlap | |
| 4,773,617 | A | * | 9/1988 | McCampbell | 244/24 |
| 5,090,637 | A | * | 2/1992 | Haunschild | 244/97 |
| 5,497,962 | A | * | 3/1996 | Wood | 244/116 |
| 5,890,676 | A | * | 4/1999 | Coleman et al. | 244/128 |
| 6,182,924 | B1 | * | 2/2001 | Nott | 244/95 |
| 6,427,943 | B1 | * | 8/2002 | Yokomaku et al. | 244/30 |
| 6,648,272 | B1 | * | 11/2003 | Kothmann | 244/97 |
| 6,698,686 | B1 | * | 3/2004 | Ogawa et al. | 244/30 |
| 6,811,115 | B1 | * | 11/2004 | Kurose | 244/97 |
| 2001/0002686 | A1 | * | 6/2001 | Yokomaku et al. | 244/30 |
| 2002/0171006 | A1 | * | 11/2002 | Boschma, Jr. | 244/31 |
| 2003/0062444 | A1 | * | 4/2003 | Goodey | 244/24 |
| 2003/0146345 | A1 | * | 8/2003 | Ogawa et al. | 244/96 |
| 2005/0156082 | A1 | * | 7/2005 | Eberle et al. | 244/96 |

FOREIGN PATENT DOCUMENTS

DE    10120232 A1    10/2002

* cited by examiner

Primary Examiner—Michael J Carone
Assistant Examiner—John A Radi
(74) Attorney, Agent, or Firm—Alston & Bird LLP

(57) ABSTRACT

An apparatus and associated method for launching and recovering a lighter-than-air aircraft are provided. The aircraft includes an envelope that is substantially filled before launch with a lift gas and a second gas. The lift gas and second gas are substantially separated in the envelope by a boundary layer of mixed gas, formed by the lift and second gases. The aircraft is supported by one or more masts as the lift gas is injected to achieve the required buoyancy for launch. The aircraft is then released and rises, for example, in an inclined orientation. As the aircraft climbs, the lift gas expands in the envelope, and the second gas is vented therefrom. During horizontal descent, air can be pumped into the envelope to maintain the envelope in a substantially filled configuration. The air and lift gas can be mixed to avoid sloshing and pooling.

14 Claims, 10 Drawing Sheets

APPARATUS AND METHOD FOR LIGHTER-THAN-AIR AIRCRAFT

BACKGROUND OF THE INVENTION

1. Field of the Invention

The present invention relates to lighter-than-air aircraft and, more particularly, relates to an apparatus and method for launching a lighter-than-air aircraft having an envelope that can be substantially full during launch.

2. Description of Related Art

Lighter-than-air (LTA) aircraft, such as zeppelins, dirigibles, blimps, and balloons typically include an envelope or container that receives a gas that is lighter than air so that the aircraft is made buoyant. The buoyancy provided by the gas can be used to lift the vehicle to flying altitudes of 50,000 feet or higher, as is known for so called high altitude platforms (HAPs). For example, a conventional blimp includes a large envelope formed of non-rigid material that is inflated with helium. The helium provides sufficient buoyancy to lift the blimp to its flying altitude. Propulsion units and control devices such as fins, vanes, and the like provide power and control for adjusting the flight path and attitude of the blimp.

A conventional LTA aircraft is typically moored to a tall mast when not in flight. A nose cone, which is attached to the nose or bow of the aircraft by battens, provides a reinforced structure for connecting to the mast. The nose cone is rotatably connected to the mast so that the aircraft rotates freely around the mast under the force of the wind. The final assembly of the aircraft can be completed with the aircraft moored on the mast and the aircraft subsequently can be launched from and landed on the mast. During launching, the gas in the envelope and/or ballast on the aircraft can be adjusted so that the aircraft is slightly aerostatically heavy, i.e., non-buoyant. The aircraft is then disconnected from the mast, and maneuvering engines are used to propel the aircraft away from the mast. During landing, the aircraft is maneuvered back to the mast, and handling lines attached to the nose of the aircraft are dropped to a ground crew, which uses the lines to guide the aircraft to the mast so that the nose cone can be reattached thereto. Once moored, the aircraft can be refueled and several maintenance procedures can be conducted without bringing the aircraft into a hangar.

The conventional mooring operation is labor intensive and expensive. A large area must be provided around the mast for the movement of the aircraft. In addition, the design of the aircraft is influenced by the mooring operations. For example, the weight of the nose cone, battens, maneuvering engines, handling lines, and other equipment for near-ground operation, such as ground impact protection, increases the weight of the aircraft, and, hence, the necessary size and capacity of the gas-filled envelope. This equipment is typically used only during near-ground operations and is unused during the rest of the flight of the aircraft. Further, the configuration and materials of the envelope and the rest of the aircraft must be designed to accommodate the functions and stresses associated with the mooring operation.

LTA aircraft such as HAPs can also include a ballonet, i.e., an inflatable bladder, that is positioned within the envelope and configured to be expanded to nearly fill the envelope. The ballonet can be filled with air, and the space within the envelope that is outside the ballonet is filled with helium. As the aircraft ascends, the helium expands and the air is vented from the ballonet so that the size of the ballonet becomes increasingly smaller while the envelope remains at a substantially constant volume. As a result of the constant volume of the envelope, the aerodynamic and structural aspects of the airship remain mostly constant during flight. Depending on the position of the ballonet, the center of buoyancy of the aircraft can be adjusted during ascent so that the pitch or orientation of the aircraft changes. However, the ballonet adds weight to the aircraft. Additionally, the ballonet can slosh, or move unpredictably, in the envelope, affecting the structural integrity of the envelope and the orientation of the aircraft.

According to another method for launching a LTA aircraft, the envelope is only partially filled with helium so that the envelope is in a slack or limp condition. As the aircraft rises, the helium expands to fill the envelope. Advantageously, there is no need for a ballonet. Further, the aircraft can be launched from the ground without the use of a mast, similar to the launching of a weather balloon, thus simplifying the ground equipment necessary for launch. The weight of the aircraft can be reduced by including no maneuvering engines, nose cone, and the like. However, because the envelope is inflated only upon ascent, equipment that is connected to the envelope and positioned by the inflation of the envelope may not be properly positioned and adjustment in flight may be difficult or impossible. Some equipment, such as solar cells connected to the outside of the envelope, can be easily damaged when the envelope changes shape. Also, stresses on the envelope during the ascension while the envelope is only partially expanded are difficult to predict, and the envelope may be damaged during ascent due to flutter or aeroelastic effects, especially as the aircraft rises through winds, such as those associated with jet streams. Since the material that is used to form the envelope is typically only slightly flexible, wrinkling can damage the fibers and/or coatings of the envelope, causing pinholes, tears, weakened areas, and the like.

Thus, there exists a need for an improved apparatus and method for launching and recovering a LTA aircraft. Preferably, a large area should not be required for launching, and the method should minimize the required heavy equipment on the aircraft for near ground operation, such as nose cones, handling lines, maneuvering engines, and the like. Further, an aircraft launched according to the improved method should maintain a substantially constant shape during launch to minimize structural and aerodynamic changes.

BRIEF SUMMARY OF THE INVENTION

The present invention provides an apparatus and associated method for launching and recovering a LTA aircraft in which the envelope of the aircraft is substantially filled before launch with a lift gas and a second gas, such as helium and air. The lift gas and second gas are kept substantially separate in the envelope with a mixed gas that forms a boundary layer that includes the lift and second gases, therebetween. The aircraft is supported by one or more masts as the lift gas is injected to achieve the required buoyancy for launch. The aircraft is then released and rises, for example, in an inclined orientation. As the aircraft rises, the lift gas expands in the envelope, and the second gas is vented therefrom.

According to a method of one embodiment of the present invention, at least one mast is provided for supporting the aircraft. The aircraft is secured to the masts while the envelope is at least partially filled with the second gas, for example, so that a longitudinal axis of the aircraft is substantially horizontal between two masts. The aircraft can be moved to a launch position by rollably moving the masts. A first end of the aircraft is then raised to an elevation higher than a second distal end of the aircraft so that a longitudinal axis of the aircraft, which extends between the first and second ends, is inclined at an angle relative to horizontal. For example, a buoyant balloon can be connected to the first end of the aircraft or a buoyant gas bag can be provided in the envelope to lift the first end. Alternatively, the envelope can be at least partially filled with the lift gas and then the first end of the aircraft can be released so that the lift gas raises the first end of the aircraft. The lift gas can be injected through a tubular channel that extends into the envelope and proximate an upper portion of the envelope so that mixing of the gases in the envelope is minimized. According to one aspect of the invention, the aircraft is released with a center of buoyancy between the center of gravity of the aircraft and a first longitudinal end of the aircraft so that the first end of the aircraft is oriented above a second distal end of the aircraft while the aircraft ascends. For example, the axis of the envelope can be oriented at an angle of at least about 45 degrees relative to horizontal while the aircraft ascends.

The aircraft can also descend with the envelope in a substantially filled configuration by receiving air in the envelope as the lift gas is vented. The air and lift gas mix during descent to avoid sloshing of the gases and resulting instability. The aircraft can be recovered and launched repeatedly.

The present invention also provides an apparatus for launching an aircraft. The apparatus includes first and second masts that are configured to be connected to the first and second ends of the envelope so that the masts support the aircraft therebetween in a substantially horizontal configuration. The second mast is rotatably connected to the envelope so that the envelope can be rotated to an inclined orientation when the first mast is disconnected from the envelope. A gas injection tube is configured to be inserted into the envelope of the aircraft and to extend from a gas source to an upper portion of the envelope. A lift device, such as a buoyant balloon, which can be connected to the first end of the envelope, is configured to lift the first end of the envelope when the first mast is disconnected from the envelope and rotate the envelope to the inclined orientation. The masts can be rollably movable and can be rotatably connected to the envelope to allow rotation of the envelope about an axis generally parallel to the longitudinal axis.

BRIEF DESCRIPTION OF THE SEVERAL VIEWS OF THE DRAWINGS

Figure 1:
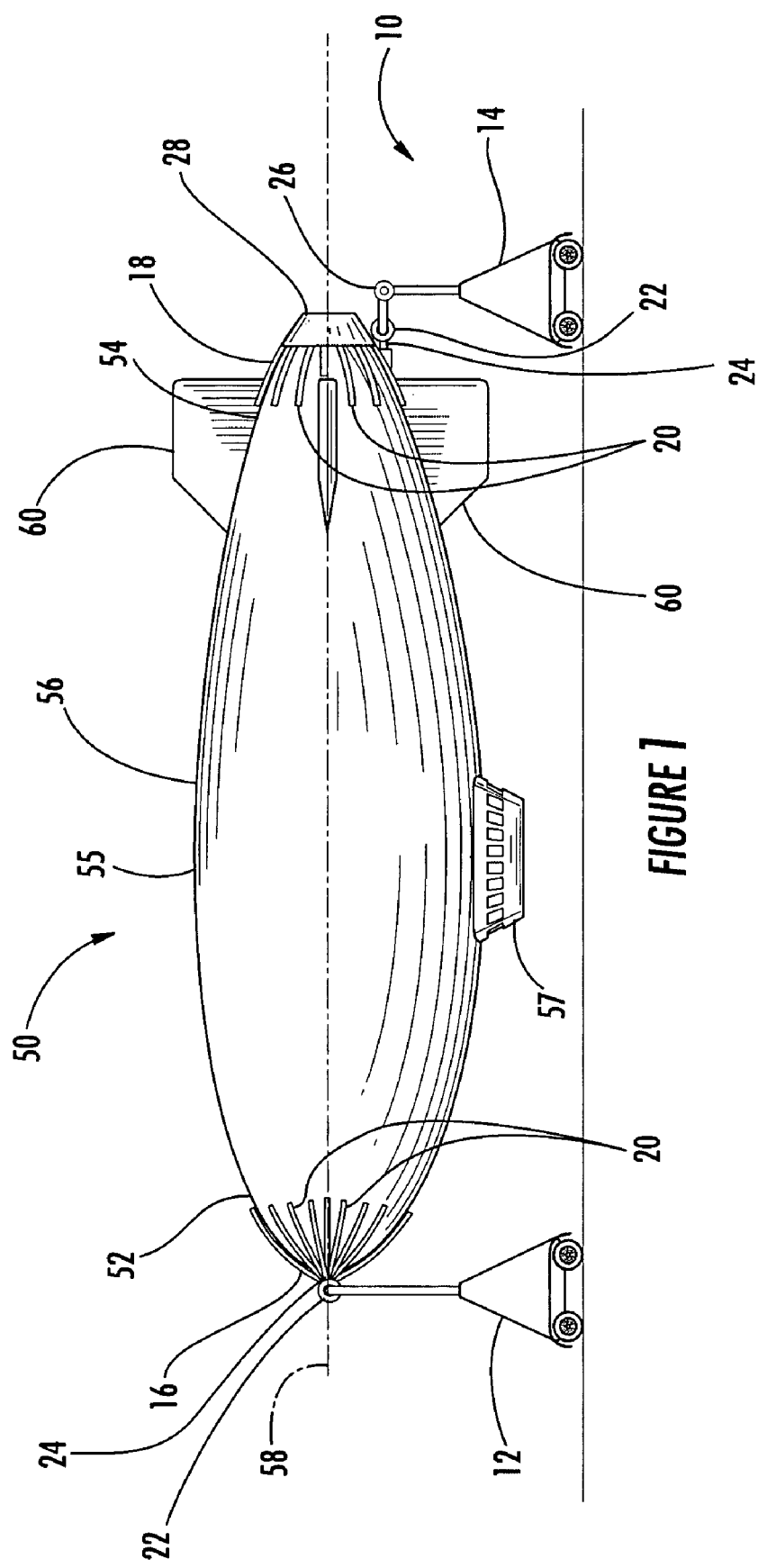
Figure 2:
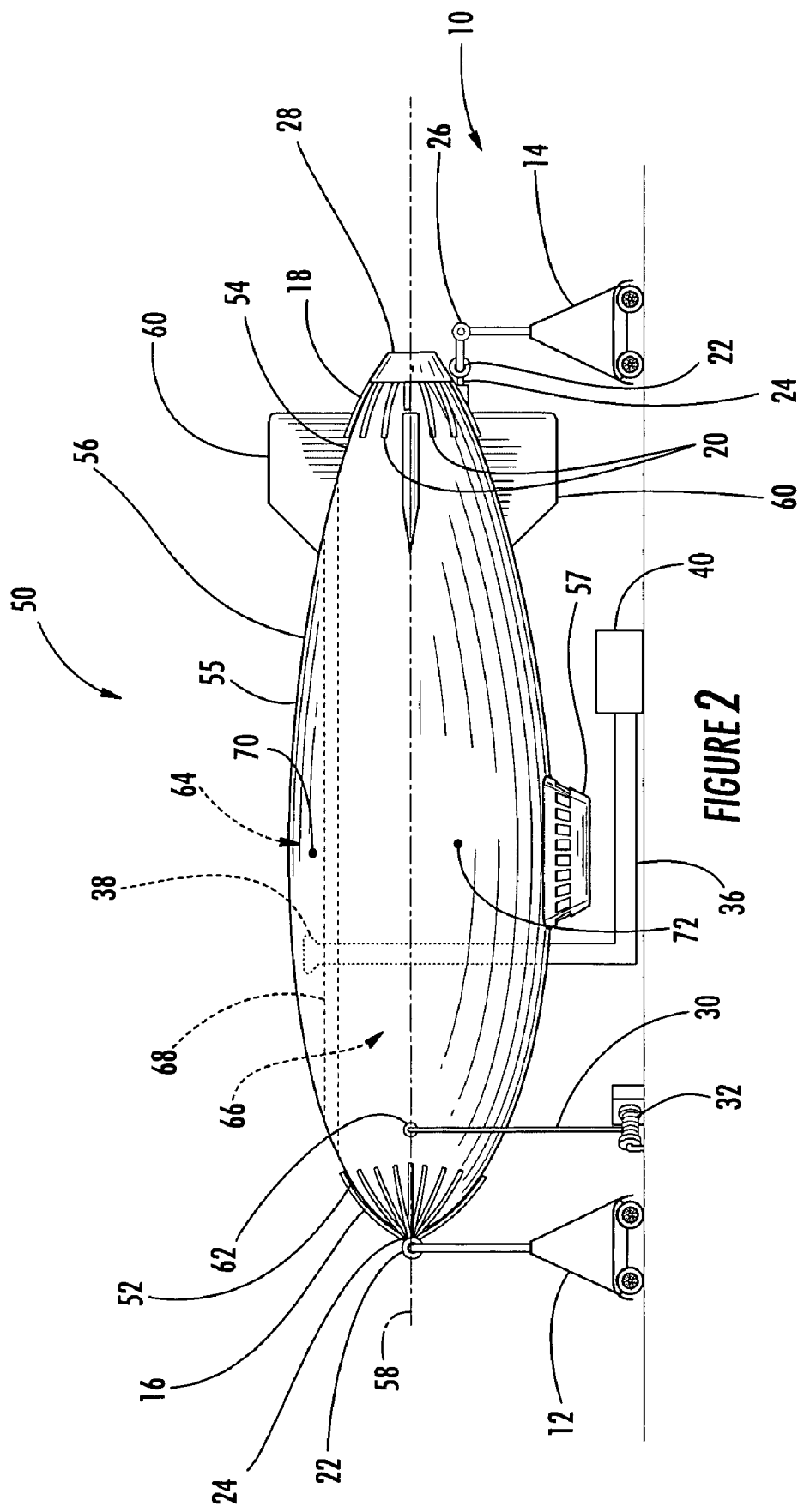
Figure 3:
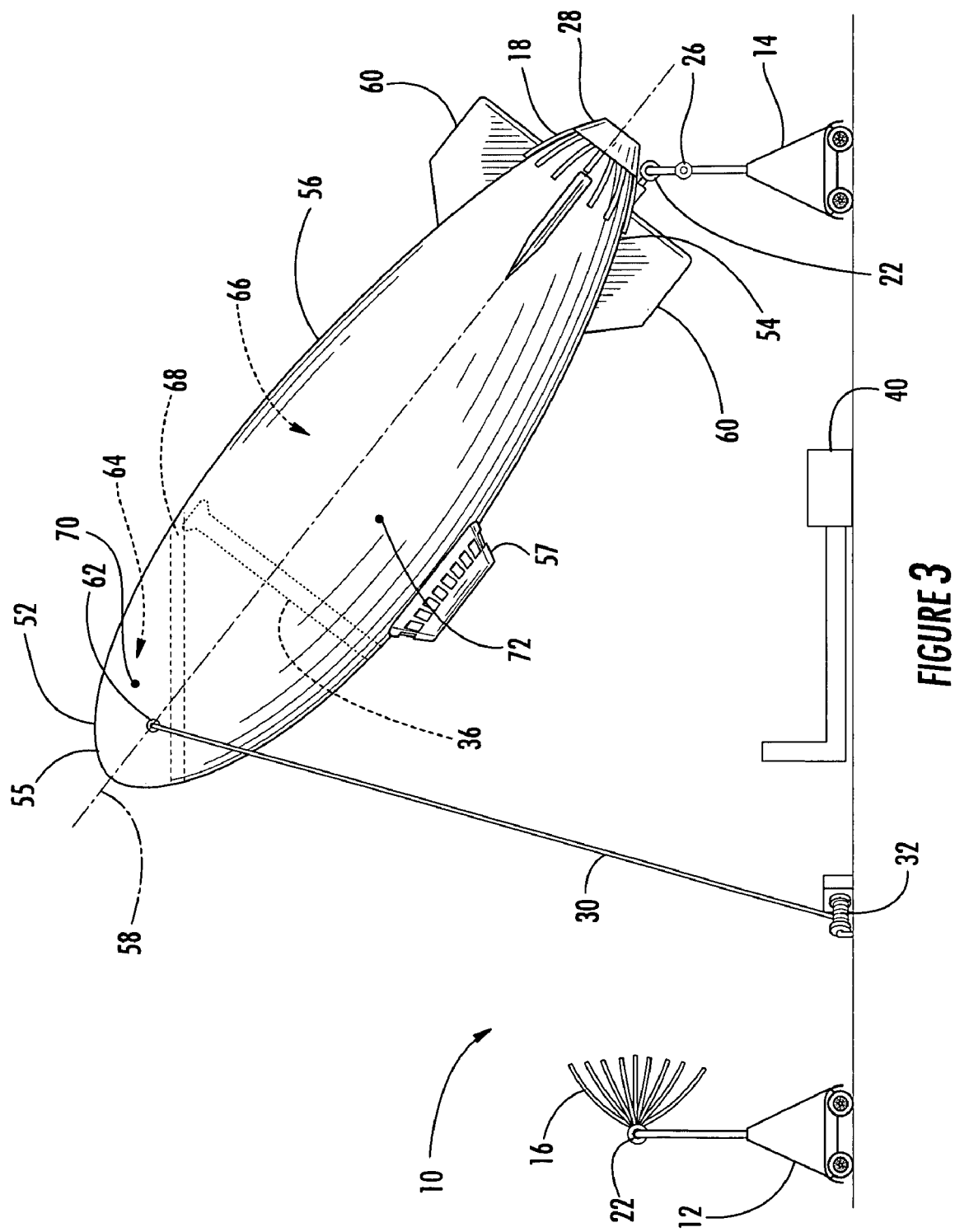
Figure 4:
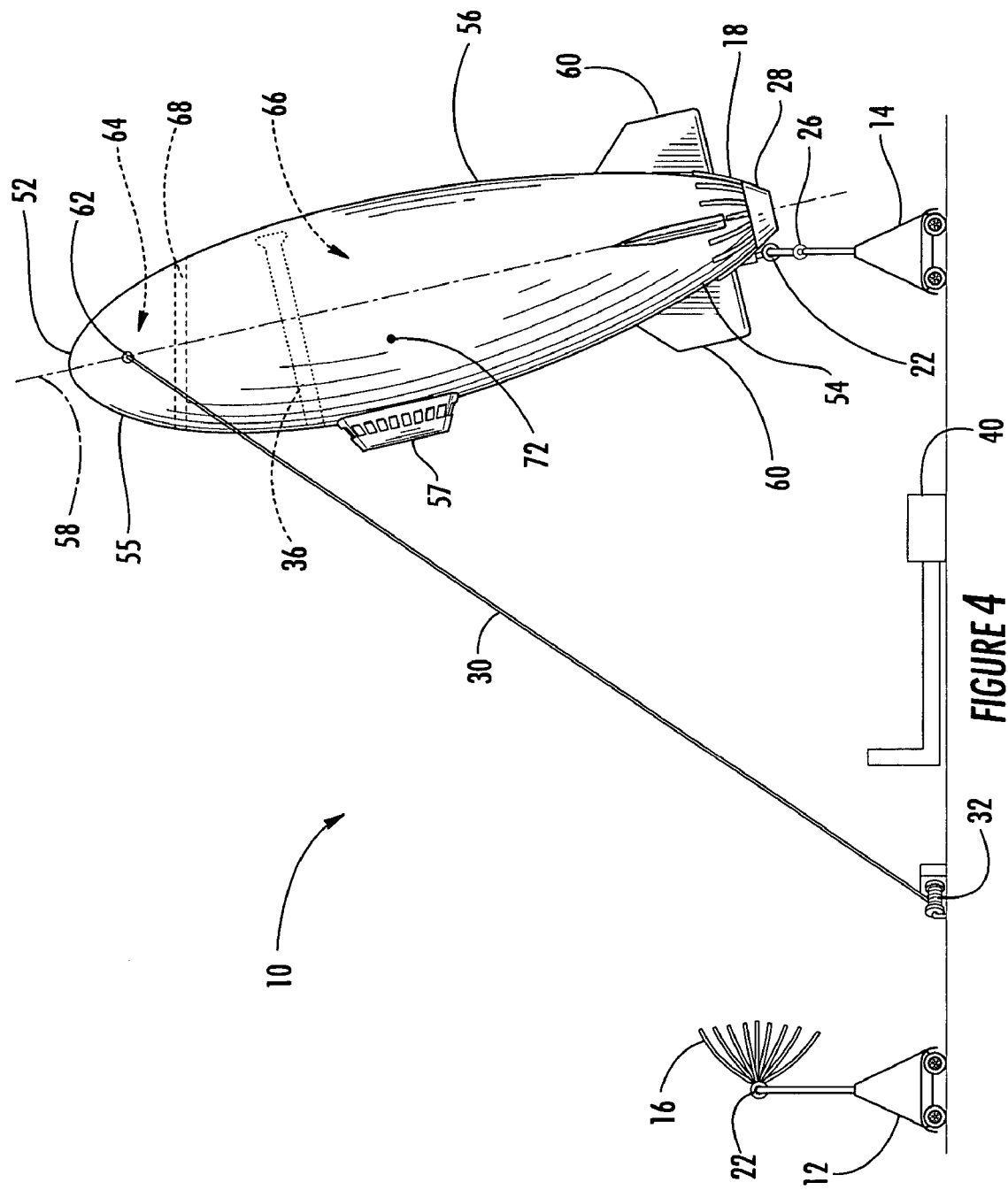
Figure 5:
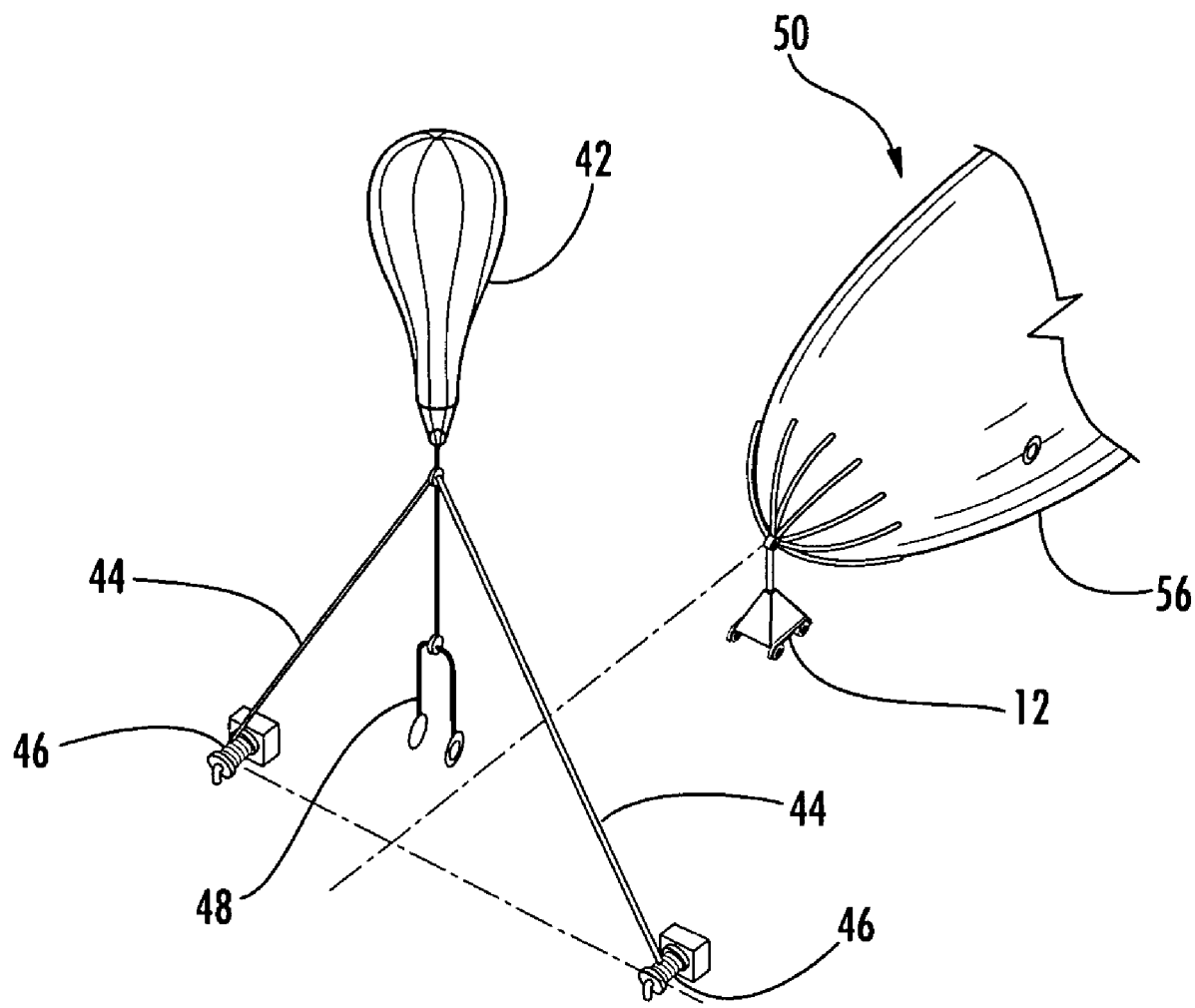
Figure 6:
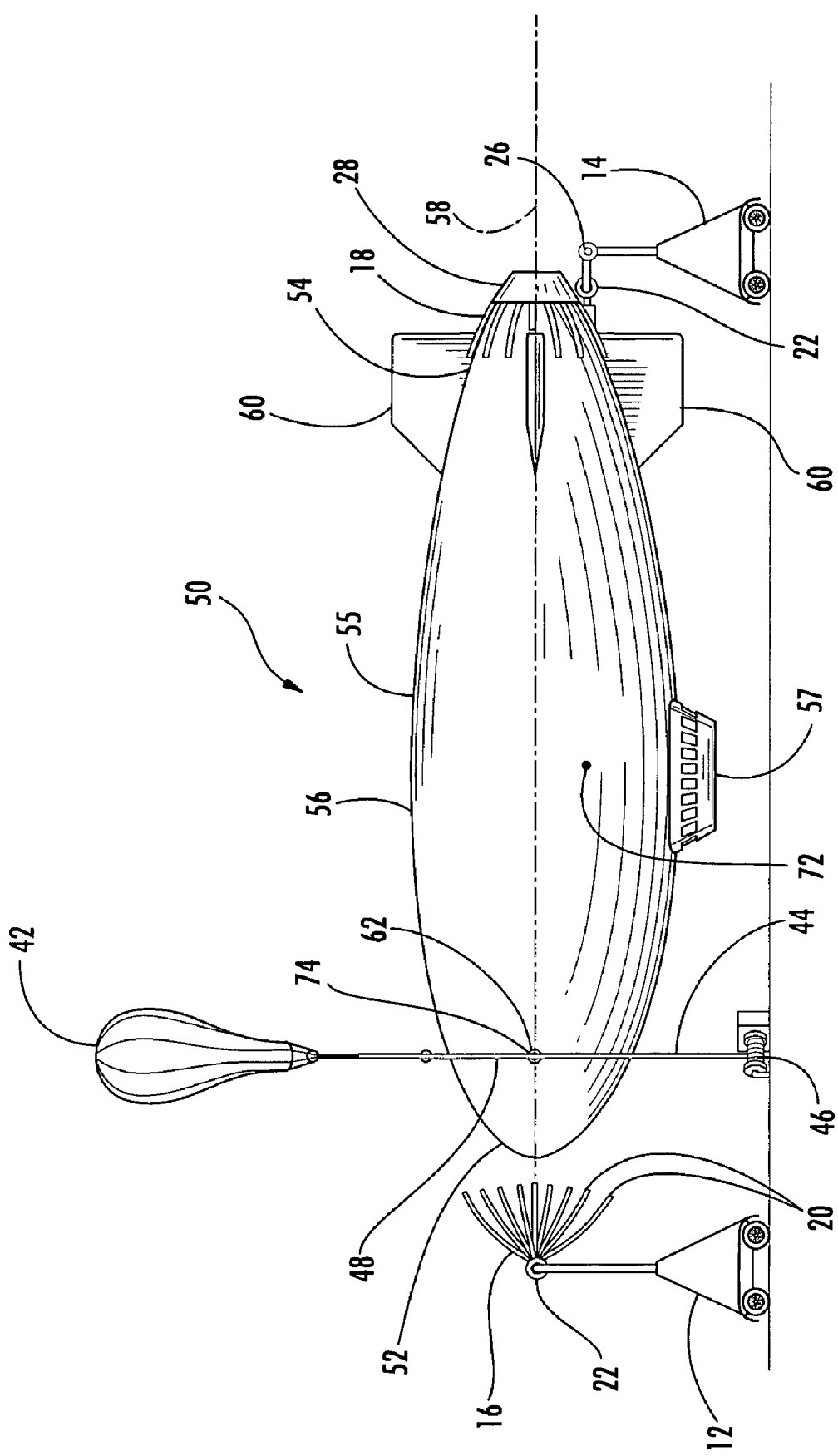
Figure 7:
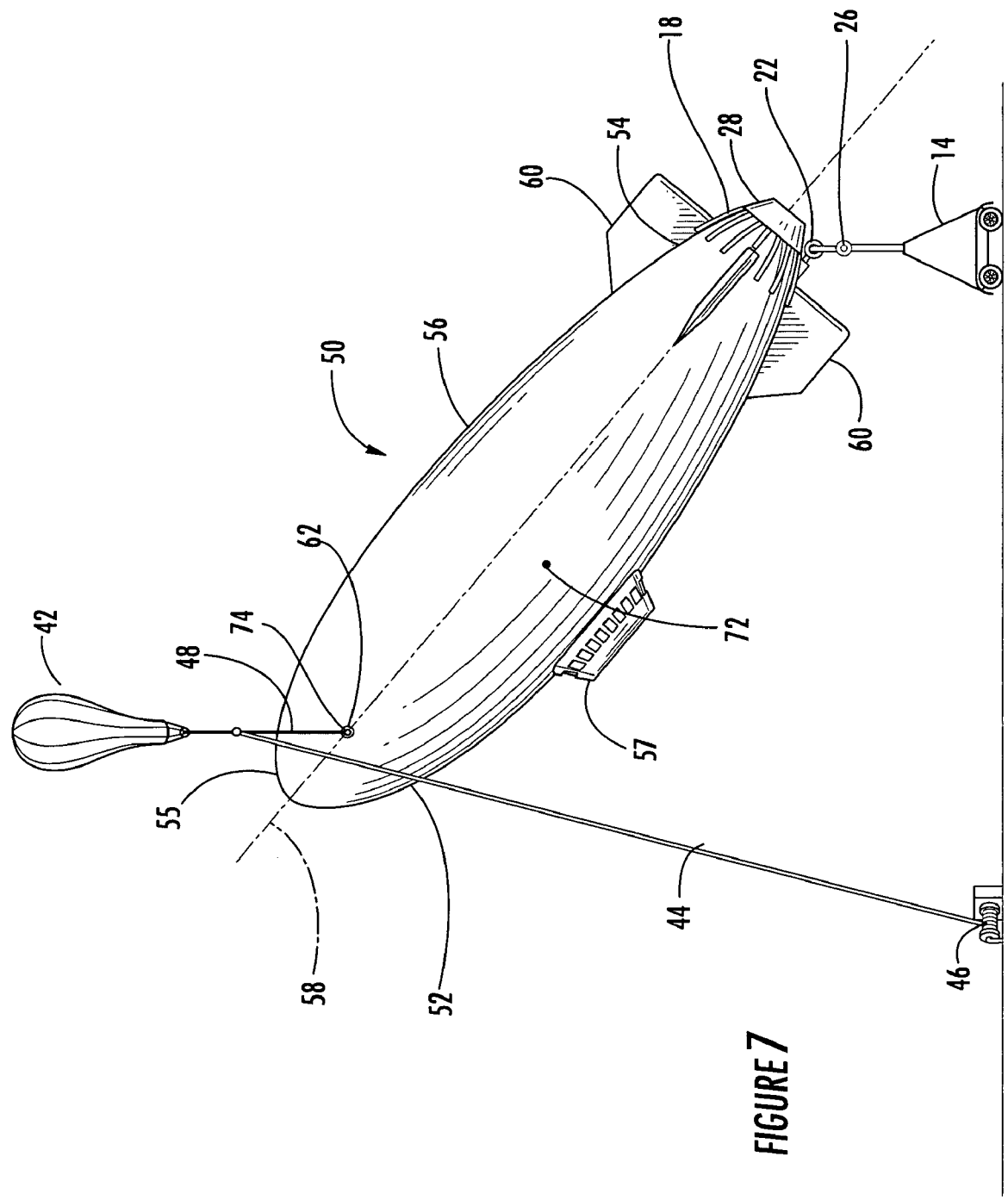
Figure 8:
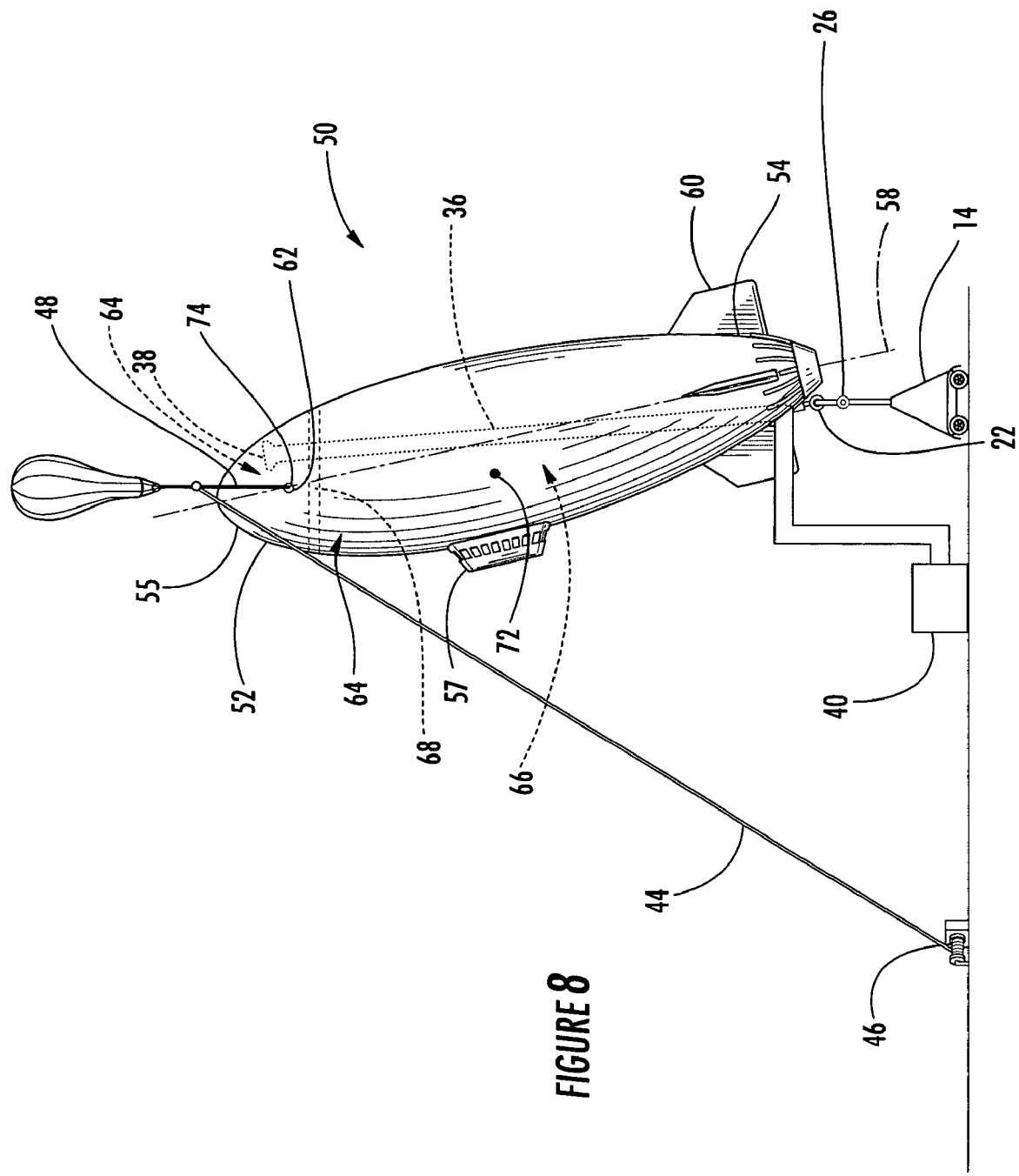
Figure 9:
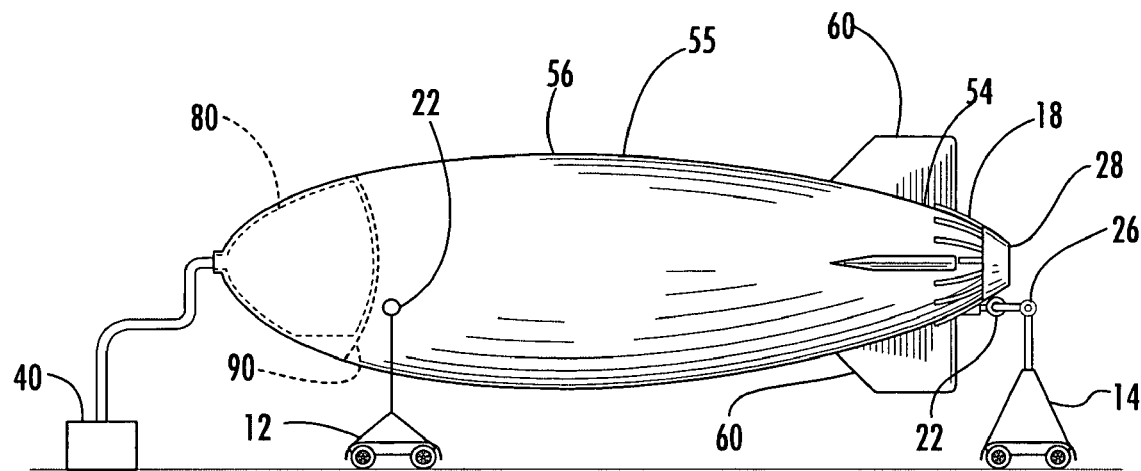
Figure 10:
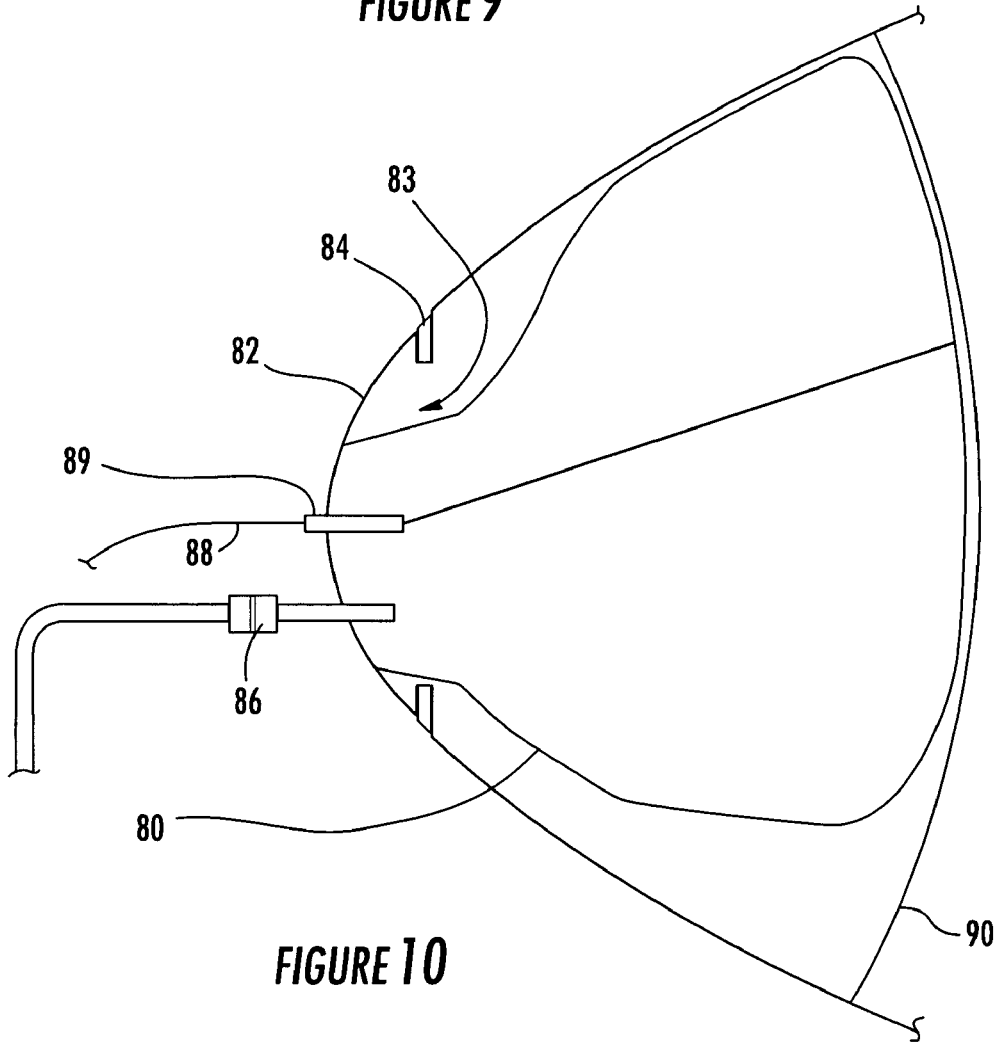

Having thus described the invention in general terms, reference will now be made to the accompanying drawings, which are not necessarily drawn to scale, and wherein:

FIG. 1 is an elevation view illustrating a LTA aircraft supported by a launch apparatus according to one embodiment of the present invention;

FIG. 2 is an elevation view of the aircraft and launch apparatus of FIG. 1 partially filled with a lift gas;

FIG. 3 is an elevation view of the aircraft and launch apparatus of FIG. 1 with the aircraft rotated to an inclined orientation;

FIG. 4 is an elevation view of the aircraft and launch apparatus of FIG. 1 with the aircraft further rotated to a launch position;

FIG. 5 is a partial perspective view of an aircraft and launch apparatus according to another embodiment of the present invention;

FIG. 6 is an elevation view of the aircraft and launch apparatus of FIG. 5;

FIG. 7 is an elevation view of the aircraft and launch apparatus of FIG. 6 with the aircraft rotated to an inclined orientation;

FIG. 8 is an elevation view of the aircraft and launch apparatus of FIG. 6 with the aircraft further rotated to a launch position;

FIG. 9 is an elevation view of an aircraft and launch apparatus according to another embodiment of the present invention;

FIG. 10 a partial section view of the aircraft of FIG. 9; and

Figure 11:
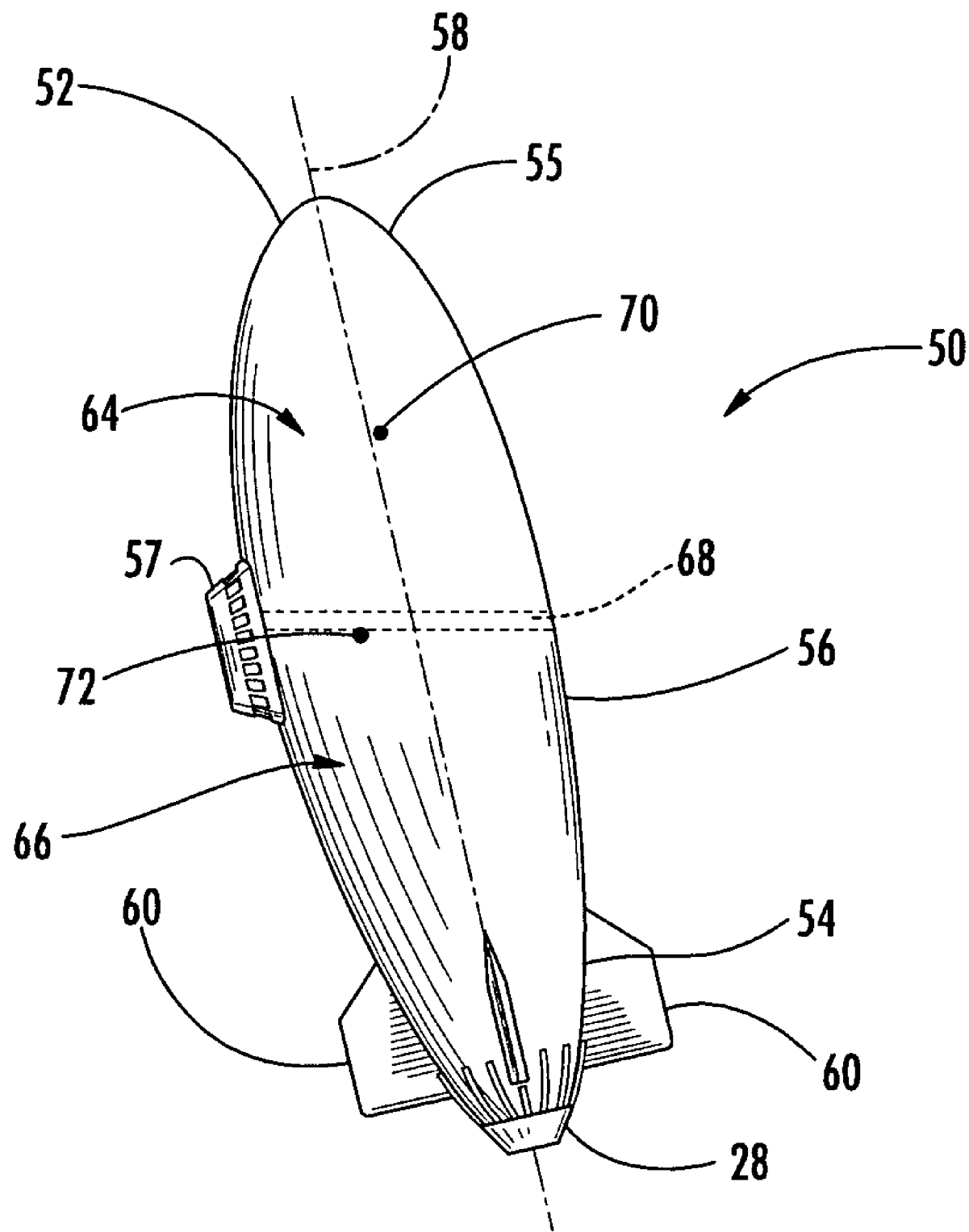

FIG. 11 is an elevation view of an aircraft according to one embodiment of the present invention in an inclined orientation while ascending.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the drawings, and in particular to FIG. 1, there is illustrated a lighter-than-air (LTA) aircraft 50 supported by a launch apparatus 10 having first and second masts 12, 14 configured to connect to a bow 52 and stem 54 of the aircraft 50, respectively. The aircraft 50 can be used for transportation, observation, communication, and a variety of other purposes. For example, the aircraft 50 can be a high altitude platform (HAP), which can ascend to an altitude of 50,000 feet or higher and includes communication equipment, such as equipment for wireless telephone or radio communication. The aircraft 50 includes an envelope 56, or pouch configured to receive and contain a lift gas and thereby provide buoyancy for lifting the aircraft 50. The envelope 56 can be formed of a variety of hermetic materials, as is known in the art, such as a fibrous material with a coating or laminated film on one or both sides thereof. For example, the envelope 56 can be formed of materials such as polyester or Vectran® fabric, a registered trademark of Hoechst Celanese Corp. The envelope 56 can be coated with polyurethane or rubber, or the envelope 56 can be laminated with films of Mylar® and/or Tedlar® films, registered trademarks of E. I. du Pont de Nemours and Company. The aircraft 50 can be of blimp-type construction, i.e., without a rigid structure. Alternatively, a structure or frame (not shown) formed of aluminum, titanium, metal alloys, composite materials, and the like can be provided inside and/or outside the envelope 56. The structure can include a gondola 57 for accommodating people or equipment.

The envelope 56 can be formed of a non-rigid material that is held in a desired shape or configuration by the pressure of the gas within the envelope 56. For example, a longitudinal axis 58 of the envelope 56 can extend between the bow 52 and stem 54 of the aircraft 50, the longitudinal axis 58 of the envelope 56 generally corresponding to a longitudinal axis of the aircraft 50. Further, fins 60, wings, rudders, elevators, and other aerodynamic control devices for controlling the motion of the aircraft 50 can be formed of stiff materials or can be inflatable. Thus, the configuration of the aircraft 50 can be achieved by filling the envelope 56 and/or control devices with gas.

The masts 12, 14 of the apparatus 10 can be connected to the envelope 56 of the aircraft 10 via connection devices such as cones 16, 18. The cones 16, 18 are formed of battens 20, which are strips or other pieces of rigid reinforcement material that are connected to the envelope 56 and spread the forces associated with the connections to the masts 12, 14 over the area of the battens 20. The battens 20 can be tied, sewn, glued, welded, or otherwise fastened to the envelope 56, and one or both of the cones 16, 18 can be removable from the envelope 56, as further discussed below. Each cone 16, 18 also includes a connection feature 22 such as a ring, hook, or any swiveling connection that is attached to the battens 20 and provides a point of connection for engaging a hook or other connection portion of the respective mast 12, 14. Thus, the masts 12, 14 can be connected and disconnected from the envelope 56, and the aircraft 50 can be supported by the masts 12, 14 such that the longitudinal axis 58 of the envelope 56 extends substantially horizontal between the two masts 12, 14. The connection features 22 of the cones 16, 18 can be attached on the axis 58 of the envelope 56 or off-center from the axis 58. For example, as shown in FIG. 1, the first mast 12 is connected to the first cone 16 at the center of the bow 52 of the aircraft 50, and the second mast 14 is connected to the second cone 18 off-center from the axis 58 of the envelope 56.

Each of the masts 12, 14 can be a wheeled device such as a motorized vehicle of sufficient weight to anchor the aircraft 50. For example, each mast 12, 14 can be a motorized truck weighing several tons. The masts 12, 14 are sufficiently tall to support the aircraft 50 above the ground, as shown in FIG. 1, and the masts 12, 14 can be of fixed height or adjustable, such as by extending or retracting telescoping sections of the masts 12, 14. The masts 12, 14 can also provide rotatable connections 24 to the aircraft 50 so that the aircraft 50 can be rotated about an axis generally parallel with the longitudinal axis 58 as well as an axis perpendicular to the longitudinal axis 58. Further, one or both of the masts 12, 14 can have a hinge 26 or other device for hinging or rotating so that the aircraft 50 can be rotated to an inclined orientation and rotated relative to the respective mast 12, 14. The hinge 26 can also be rotated to adjust the height of the aircraft 50 and the position of the aircraft 50 relative to the masts 12, 14, for example to facilitate the installation of a propeller on the propulsion unit 28. Flexible connection devices such as ropes or chains can be used as the primary connections between the masts 12, 14 and cones 16, 18 or as secondary connections therebetween.

According to one construction method of the present invention, the aircraft 50 is assembled in a hangar at the launch site. First, the envelope 56 can be spread out on a work surface, visually inspected, and tested for leaks by filling and pressurizing the envelope 56 with air. Next, certain structural components and other equipment of the aircraft 50 can be assembled with the envelope 56, such as an internal frame or load distribution system; electrical wires and conduits therefor; gas control devices such as pipes, hoses, and valves used to regulate the flow of gas to and from the envelope 56; a payload, which can be located inside or outside the envelope 56; and cables for bracing and controlling the fins 60 or other aerodynamic control structures. The fins 60 can be welded to the envelope 56 and can be inflated or otherwise configured before, during, or after the ascent of the aircraft 50. Also, a propulsion unit 28 such as an engine or other thrust device can be connected to the envelope 56. The components and equipment can be installed while the envelope 56 is partially inflated with air, and the volume of air in the envelope 56 can be adjusted during assembly to facilitate access to the different parts of the envelope 56.

The envelope 56 can then be substantially filled with air so that the envelope 56 is configured to a shape similar to its typical shape during flight, with the exception of a flattened portion of the envelope 56 that is supported by the work surface. The battens 20 of the cones 16, 18 are then attached to the respective ends of the envelope 56. Preferably, the battens 20 of the first cone 16 are releasably connected to the bow 52 so that the first cone 16 can be quickly and easily disconnected from the aircraft 50. Cranes or other lifting equipment can then be used to lift the aircraft 50 using the connection features 22 on the cones 16, 18, and the connection features 22 can then be connected to the masts 12, 14 as illustrated in FIG. 1. With the aircraft 50 suspended between the masts 12, 14, the aircraft 50 can be rotated and a locking mechanism on the masts 12, 14 can be used to restrain the aircraft 50 in various rotational positions to facilitate access to the different portions of the envelope 56 while further assembly is performed. For example, the aircraft 50 can be rotated so that a particular portion of the envelope 56 is located at a bottom or side position of the aircraft 50, and a person on a crane or other elevating device can access the envelope 56 to install equipment, inspect the envelope 56, and the like. Equipment installed on the envelope 56, such as solar cells, can be installed in its final or operating position or configuration. The aircraft 50 can be moved while suspended from the masts 12, 14, for example, by rollably moving the masts 12, 14 out of the hangar and possibly to a launch area.

As shown in FIG. 2, one or more restraining lines 30 can be connected to reinforced patches 62 on the envelope 56. The restraining lines 30 can be secured to winches 32 or other line control devices. A gas injection tube 36 can be connected to a gas source 40 and fluidly connected to the envelope 56. For example, the gas injection tube 36 can be partially inserted into the envelope 56 of the aircraft 50 as illustrated in FIG. 2. The gas source 40 is configured to supply the lift gas, such as helium, and the injection tube 36 is configured to direct the lift gas into the envelope 56. The gas injection tube 36 can be inserted into the envelope 56 to a position near the top 55, or upper portion, of the envelope 56, and a diffuser 38 can be provided on the end of the tube 36 inside the envelope 56 to slow the speed of the gas entering the envelope 56 and reduce the mixing of the gases therein. The tube 36 is formed of a lightweight fabric or other flexible material. Alternatively, the tube 36 can be positioned outside the envelope 56 and connected to a port located at the desired point of entry of the lift gas, for example, at the upper portion 55 of the envelope 56.

According to one embodiment of the present invention shown in FIG. 2, the envelope 56 is inflated with air and supported by the apparatus 10. The gas injection tube 36 is then inserted through a port in the envelope 56 and the lift gas is injected into the envelope 56 near the top 55 of the envelope 56 so that the lift gas enters and pools at the top 55 of the envelope 56 and air is vented through one or more valves at the bottom of the envelope 56. Preferably, as the helium replaces the air in the envelope 56, the helium and the air remain substantially separate in pools 64, 66 of the respective gases. A mixed gas, i.e., a mixture of the helium and the air, forms in a boundary layer 68 between the helium pool 64 and the air pool 66 in the envelope 56. The boundary layer 68, i.e., the mixed gas, moves downward as additional helium is injected into the envelope 56. As the amount of helium in the envelope 56 increases, the buoyancy of the envelope 56 increases, and the weight of the aircraft 50 that is supported by the masts 12, 14 decreases.

When the envelope 56 contains a sufficient amount of helium to lift the aircraft 50, the restraining line 30 is tightened and the cone 16 on the bow 52 of the envelope 56 is removed, disconnecting the aircraft 50 from the first mast 12. Then, as shown in FIG. 3, the restraining line 30 is extended so that the bow 52 of the aircraft 50 rises and the aircraft 50 rotates relative to the second mast 14, the longitudinal axis 58 of the aircraft 50 becoming inclined. Preferably, the restraining line 30 is extended smoothly and gradually by the winch 32 or other line control device so that the motion of the aircraft 50 is controllably adjusted and the mixing of the gases in the envelope 56 is minimized. When the aircraft 50 is rotated to a launch configuration, shown in FIG. 4, the restraining line 30 can be released, and the second mast 14 can be released from the second cone 18 to launch the aircraft 50, which then begins to ascend. In one embodiment, the launch position is a position in which the center of volume of the lifting gas 70 of the aircraft 50 is located directly above the center of gravity 72 of the aircraft 50. The center of volume of the lifting gas 70 is the gravitational center of the lift gas within the envelope 56.

While the lift provided by the helium in the envelope 56 rotates the aircraft 50 to the launch position in the foregoing example, a lift device can alternatively be used as illustrated in FIGS. 5–8. The lift device can be a buoyant vessel such as balloon 42, as shown in FIG. 5, which is filled with hydrogen, helium, or another gas that is lighter than air. The balloon 42 is restrained by one or more balloon control lines 44, which extend from the balloon 42 and are connected to winches 46 or other line control devices. Connection lines 48 that extend from the balloon 42 are configured to be connected to the aircraft 50. Thus, the aircraft 50 can be supported by the masts 12, 14 and moved by the masts 12, 14 to the balloon 42. The connection lines 48 are connected to reinforced patches 62 on the envelope 56, as shown in FIG. 6, and the control lines 44 can be loosened so that the balloon 42 exerts an upward force on the envelope 56, thereby taking some or all of the weight of the aircraft 50 off of the first mast 12. The first mast 12 is then disconnected from the envelope 56 by releasing the cone 16 or the battens 20 so that the cone 16 is released from the envelope 56 or the mast 12. The balloon 42 is sufficiently buoyant to lift the bow 52 of the aircraft 50 and rotate the envelope 56 about the second mast 14 at least partially toward the launch position as the control lines 44 are extended, as shown in FIG. 7. For example, if the envelope 56 has a maximum take-off weight (MTOW) of about 20 tons, the balloon 42 could have a lift capacity of about 12 tons. For example, a spherical balloon 42 with a diameter of about 30 meters and filled with hydrogen can be used.

The gas injection tube 36 is inserted into the envelope 56, and helium or another lift gas is injected into the top portion 55 of the envelope 56 as described above. As shown in FIG. 8, the tube 36 can be inserted through a port in the stern 54 of the envelope 56 and extended to the bow 52 of the aircraft 50. Thus, the helium enters the top 55 of the envelope 56, i.e., the highest portion of the envelope 56, and air is vented through valves at a lower portion of the envelope 56, i.e., near the stern 54 of the aircraft 50. When sufficient helium has been injected to lift the aircraft 50, the balloon 42 can be released from the aircraft 50, for example, using a remote-controlled electronic or pyrotechnic actuator 74 that disconnects the connection lines 48 from the aircraft 50. The second mast 14 is also disconnected from the aircraft 50, launching the aircraft 50 to begin its ascent. The tube 36 can be removed from the envelope 56 or can remain therein during flight. A remote controlled valve on the balloon 42 can be actuated to vent the gas from the balloon 42, and/or the control lines 44 can be used to pull the balloon 42 back towards the ground.

According to another embodiment of the present invention, a gas bag 80 can be provided in the envelope 56 and configured to receive the lift gas from the gas source 40 to keep the lift gas from mixing with the second gas in the envelope 56 until a desired time. For example, as shown in FIGS. 9 and 10, the gas bag 80 is connected to a cover 82 that is used to close an orifice 83 in the envelope 56. The orifice 83 is located at one end of the envelope 56, and the envelope 56 is reinforced by a reinforcement ring 84 that extends circumferentially around the orifice 83. The cover 82 is connected to the reinforcement ring 84 during assembly such that the cover 82 seals the orifice 83. The cover 82 can include an injection port 86 for receiving the lift gas therethrough, i.e., from the source 40 and into the gas bag 80. Further, a ripcord 88 or other control device can extend through a sealed port 89 in the cover 82 so that the gas bag 80 can be opened from outside the envelope 56.

Thus, the gas bag 80, which can be formed of a lightweight plastic film and sealed to the cover 82, can be inserted into the envelope 56 through the orifice 83 during assembly of the aircraft 50. The cover 82 is then connected to the reinforcement ring 84. The gas source 40 is connected to the port 86 and the lift gas is delivered to the gas bag 80, which can be of sufficient size to hold all of the lift gas required for operation of the aircraft 50. A net 90 or other bulkhead can be provided in the envelope 56 can support the gas bag 80 and restrict expansion and/or movement of the gas bag 80 within the envelope 56.

The gas bag 80 can be filled with the lift gas at any time during the assembly or launch of the aircraft 50. For example, the gas bag 80 can be filled while the aircraft 50 is still in a hangar so that the lift gas provides buoyancy to the aircraft 50 while the aircraft 50 is moved out of the hangar. The aircraft 50 can be supported by the masts 12, 14, as described above, while the aircraft 50 is moved to the desired launching site. The masts 12, 14 can be attached to the connection features 22 of the envelope 56, which can be located at the bow 52 and stem 54 or other positions on the envelope 56.

Launch is accomplished by releasing the aircraft 50 from the first mast 12 so that the aircraft 50 rotates to a vertical position, similar to that illustrated in FIG. 8. Restraining lines 30 can also be used to control the rotation of the aircraft 50, as described above. The ripcord 88 is used to open the gas bag 80 so that the lift gas in the gas bag 80 is released therefrom in the envelope 56. For example, the ripcord 88 can be pulled to tear the gas bag 80 or actuate a device for opening the bag 80. The lift gas then begins to mix with the second gas in the envelope 56 to form the boundary layer 68, as described in connection with FIG. 8. Upon release of the aircraft 50 from the second mast 14, the aircraft 50 begins to ascend. After flight, the gas bag 80 and the cover 82 can be removed from the aircraft 50 and replaced with a new gas bag and cover for a subsequent flight.

FIG. 11 illustrates an aircraft 50 launched by any of the methods described above in connection with FIGS. 2–4, 5–8, and 9–10. In the inclined configuration during ascent, the helium pool 64 is located at the upper end 55, i.e., bow 52, of the envelope 56, and the air pool 66 is located at the lower, i.e., stem 54, of the envelope 56. The boundary layer 68 formed of the mixed gas is between the helium and air pools 64, 66. As the aircraft 50 ascends and the atmosphere becomes decreasingly dense, the helium and the air expand. Air from the lower portion of the envelope 56 is vented to the atmosphere, and the boundary 68 formed by the mixed gas moves lower in the envelope 56. Nearly all of the air can be vented from the envelope 56 so that the aircraft 50 contains little or no air when it reaches a desired flight altitude. The time required for ascent depends on the rate of ascent and the desired flight altitude. For example, an ascent time of about 1 hour, 11 minutes would be required for the aircraft 50 to climb to a flight altitude of 70,000 at a rate of about 5 meters per second (16.4 feet per second). At an ascent rate of 1 meter per second (3.3 feet per second), the same ascent would take about 5 hours, 54 minutes. The rate of ascent can be controlled by venting lift gas from the envelope 56 and/or by dropping ballast from the aircraft 50. Ballast can be carried at the stem 54 of the aircraft 50 to balance the aircraft 50 in the upright orientation illustrated in FIG. 11.

The mixed gas that forms the boundary layer 68 can also be vented from the envelope 56. As the mixed gas is vented, the buoyancy of the aircraft 50 is reduced, thereby slowing the ascent of the aircraft 50. Additionally, as indicated in FIG. 11, the center of volume of the lifting gas 70 of the aircraft 50 moves toward the stem 52 as the air is vented therefrom and the gas within the envelope 56 becomes substantially homogenous throughout. Ballast can also be adjusted or jettisoned to adjust the weight balance or net buoyancy of the aircraft 50. For example, water, other liquids, or sand can be held in ballast bags (not shown) on the aircraft 50 and redistributed on the aircraft 50 or released. Thus, as the aircraft 50 approaches and reaches the desired flight altitude, the orientation of the aircraft 50 can be adjusted so that the longitudinal axis 58 is adjusted from the inclined orientation to a horizontal or nearly horizontal flight orientation.

During flight, the propulsion unit 28, fins 60, and other maneuvering equipment can be used to control the speed, direction, and orientation of the aircraft 50 as is known in the art. The aircraft 50 can also include one or more ballonets that are full of air upon takeoff and used during flight to regulate the gas pressure in the envelope 56. The propulsion unit 28, fins 60, and other maneuvering equipment can be used to adjust the altitude of the aircraft 50 and/or descend for landing. Helium can also be vented from the envelope 56 during descent, and air can be received into the envelope 56 such that the volume of the envelope remains substantially constant. Blowers or fans in the envelope 56 can be used to pump the air into the envelop 56 and to mix the gas therein to prevent separation of the helium and air, thus avoiding instability due to pooling and/or sloshing of the gases. The aircraft 50 can be landed onto the ground and then secured again to the masts 12, 14 for subsequent launching. Thus, the aircraft 50 can be used for repeated flights.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for launching an aircraft having an envelope for receiving a lift gas that is lighter than air, the method comprising:
   providing the aircraft with a second gas in the envelope, the second gas being heavier than the lift gas;
   introducing the lift gas into the envelope of the aircraft so that the aircraft is buoyant and the envelope is substantially full of a combination of the lift gas and the second gas, the lift gas and the second gas being substantially separate in the envelope with a mixed gas formed by the lift and second gases therebetween;
   releasing the aircraft so that the aircraft ascends; and
   venting the second gas from the envelope.

2. A method according to claim 1 wherein said providing step comprises providing air as the second gas in the envelope.

3. A method according to claim 1 wherein said introducing step comprises introducing helium into the envelope as the lift gas.

4. A method according to claim 1 wherein said introducing and releasing steps comprise releasing the aircraft with a center of buoyancy being between the center of gravity of the aircraft and a first longitudinal end of the aircraft such that the first end of the aircraft is oriented above a second distal end of the aircraft while the aircraft ascends.

5. A method according to claim 4 wherein said introducing and releasing steps comprise releasing the aircraft such that an axis of the envelope extending between first and second ends thereof is oriented at an angle of at least about 45 degrees relative to horizontal while the aircraft ascends.

6. A method according to claim 1 further comprising:
   providing at least one mast for supporting the aircraft;
   securing the aircraft to the at least one mast; and
   raising a first end of the aircraft to an elevation higher than a second distal end of the aircraft such that a longitudinal axis of the aircraft extending between the first and second ends is inclined at an angle relative to horizontal.

7. A method according to claim 6 wherein said raising step comprises connecting a buoyant balloon to the first end of the aircraft such that the balloon lifts the first end of the aircraft.

8. A method according to claim 6 wherein said raising step comprises at least partially filling a gas bag in the envelope with the lift gas such that the gas bag lifts the first end of the aircraft.

9. A method according to claim 6 wherein said securing step comprises securing the first and second ends of the aircraft to first and second masts such that the longitudinal axis of the aircraft is substantially horizontal.

10. A method according to claim 6 wherein said raising step comprises at least partially filling the envelope with the lift gas and releasing the first end of the aircraft such that the lift gas raises the first end of the aircraft.

11. A method according to claim 6 further comprising rollably moving at least one of the masts after said securing step.

12. A method according to claim 1 wherein said introducing step comprises injecting the lift gas through a tubular channel extending into the envelope and proximate an upper portion of the envelope to minimize mixing of the lift gas in the envelope.

13. A method according to claim 1 further comprising al least partially venting the lift gas from the envelope and receiving air in the envelope such that the aircraft descends with the envelope in a substantially filled configuration.

14. A method according to claim 13 further comprising repeating said introducing, releasing, and first and second venting steps in order to repeat the launching of the aircraft.

* * * * *

UNITED STATES PATENT AND TRADEMARK OFFICE
CERTIFICATE OF CORRECTION

| | |
|---|---|
| PATENT NO. | : 7,055,778 B2 |
| APPLICATION NO. | : 10/752425 |
| DATED | : June 6, 2006 |
| INVENTOR(S) | : Eberle et al. |

Page 1 of 1

It is certified that error appears in the above-identified patent and that said Letters Patent is hereby corrected as shown below:

<u>Column 4,</u>
Lines 31 and 60, "stem" should read --stern--.

<u>Column 8,</u>
Lines 39 and 60, "stem" should read --stern--.

<u>Column 9,</u>
Lines 11 and 18, "stem" should read --stern--.

<u>Column 10,</u>
Line 58, "al" should read --at--.

Signed and Sealed this

Twenty-fourth Day of April, 2007

JON W. DUDAS
*Director of the United States Patent and Trademark Office*